R. HEIDECKE.
SHUTTER OPERATING MECHANISM FOR PHOTOGRAPHIC CAMERAS.
APPLICATION FILED DEC. 31, 1912.
1,075,101.  Patented Oct. 7, 1913.
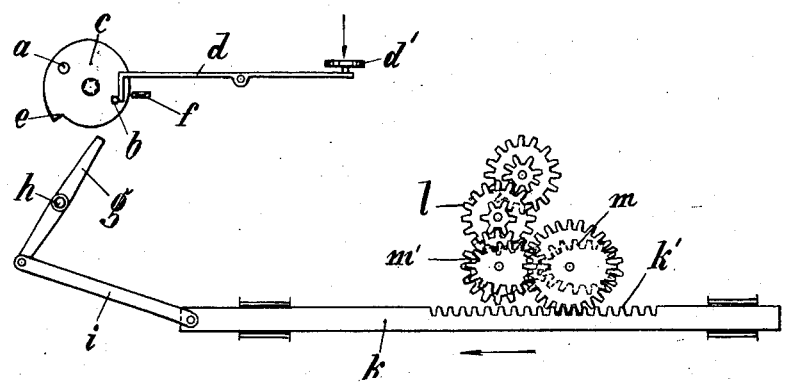
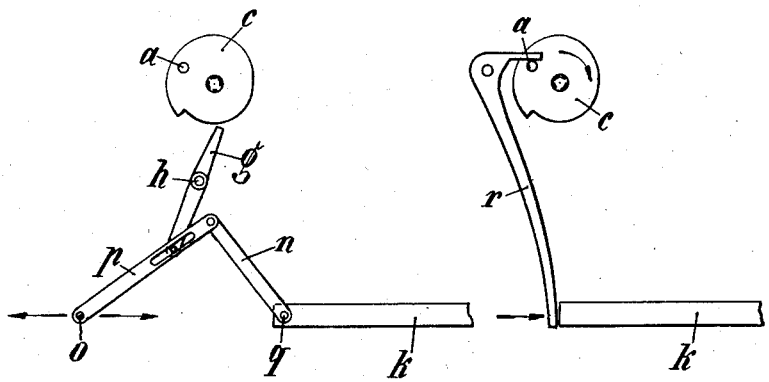

ns is rapidly reduced after the masses have once acquired a substantially constant speed, because then only the resistance caused by friction must be overcome.
UNITED STATES PATENT OFFICE.

REINHOLD HEIDECKE, OF BRUNSWICK, GERMANY, ASSIGNOR TO VOIGTLAENDER & SOHN, AKTIENGESELLSCHAFT, BRUNSWICK, GERMANY, OF BRUNSWICK, GERMANY, A CORPORATION OF GERMANY.

SHUTTER-OPERATING MECHANISM FOR PHOTOGRAPHIC CAMERAS.

1,075,101. Specification of Letters Patent. Patented Oct. 7, 1913.

Application filed December 31, 1912. Serial No. 739,507.

*To all whom it may concern:*

Be it known that I, REINHOLD HEIDECKE, workmaster, citizen of the Duchy of Brunswick, Empire of Germany, residing at Brunswick, Germany, have invented certain new and useful Improvements in Shutter-Operating Mechanisms for Photographic Cameras, of which the following is a specification.

My invention relates to improvements in shutter operating mechanisms for photographic cameras, and more particularly in operating mechanisms of that class in which the shutter is opened and closed again by means of a spring actuated member which is normally locked in inoperative position and begins its movement for operating the shutter after it has been released. After the said member has opened the shutter it meets a retarding device which is connected with braking means adapted to prevent rapid movement, so that the retarding device can but slowly recede from the opening member. After the retarding device has been pushed backward to a certain point, the shutter is closed.

In apparatus now in use the braking means are provided by toothed gearings the resistance of which produces the braking action. In some cases this braking action is increased by means of a wind wheel connected with the gearing. The braking action and thereby the time during which the shutter keeps the camera open is varied by varying the moment at which the retarding device gets into the path of the closing member. If with apparatus of this construction a very short exposure is required, and therefore the retarding device exerts its braking action on the shutter operating member during a very short part of the stroke of the latter and on a small part of its path, comparatively much time is required before the retarding device gets out of the way of the operating member, because by reason of the inertia it takes comparatively much time to set the gear wheels into motion. If on the other hand the masses of the said gear wheels are reduced, it is not possible to open the shutter as long as is required for longer exposures, because the resistance of the parts is rapidly reduced after the masses have once acquired a substantially constant speed, because then only the resistance caused by friction must be overcome.

The object of the improvements is to provide a mechanism in which these objections are avoided.

With this object in view my invention consists in constructing the mechanism in such a way, that its resistance is gradually increased while it is in operation. For this purpose between the retarding device and the mechanism which provides the braking means and which is in operative connection with the retarding device and controls the speed with which it recedes, a transmission gearing is interposed which has a varying ratio of transmission. Gearings of this kind are for example elliptical gear wheels, antiparallel cranks, rotating cam slots, etc. The mechanism is so disposed, that at the beginning the velocity of the movement transmitted from the retarding device to the braking means is reduced, and that the transmission is gradually changed, so that finally the velocity is increased by the transmission gearing, and the ratio of the numbers of revolution of the parts is reduced the longer the movement lasts. Therefore, at the beginning of the movement the retarding device is shifted at a greater speed as compared to the number of revolutions of the mechanism, and its comparative speed is gradually reduced.

In order that my invention be more clearly understood an example embodying the same has been shown in the accompanying drawing, in which the same letters of reference have been used in all the views to indicate corresponding parts.

In said drawing—Figure 1, is a diagrammatical side view of the mechanism, Fig. 2, is a similar side view of the left hand part of the mechanism showing the connection between the retarding device, its setting member and the slide bar of the braking means, and Fig. 3, is a similar side view showing the mechanism for returning the slide bar into initial position.

To a rotary disk $c$ which is acted upon by a spring (not shown) a pin $a$ is secured which has the function to operate the shutter mechanism. This shutter mechanism is known in the art and needs no detailed description. Normally the disk $c$ is locked by means of a locking member $b$ which is adapted to be thrown into non-locking position by means of a rocking lever $d$ carrying a key $d'$. When the disk $c$ is thus released, it is rotated by its spring so as to operate the shutter mechanism. In case of very short snap shots the disk $c$ rotates without any interruption, until it has completed its movement, that is, until a shoulder $e$ formed on the disk strikes against a relatively fixed stop $f$. When the disk $c$ is thus rotated, the pin $a$ opens and closes the shutter.

If a short time exposure is desired, a movable retarding device $g$ is brought into the path of the shoulder $e$, before the latter reaches the stop $f$ by which the end position of the disk $c$ is determined. The retarding device $g$ has the function to delay the movement of the disk $c$. It is so constructed, that it gradually recedes under the pressure exerted thereon by the shoulder $e$. For this purpose it is constructed in the form of a lever which has a rocking support on a pivot $h$, and it is connected by means of a link $i$ with a slide rod $k$ formed with rack teeth $k'$. The rack is in engagement with gear wheels $l$ the object of which is to provide a brake for retarding the movement of the slide bar $k$ and the disk $c$. These parts are known in the art. They will therefore be fully understood from my brief description thereof.

Referring now to those parts to which my invention more particularly relates, the transmission of the movement of the rack $k'$ to the gear wheels $l$ is effected in the example shown in the drawing by elliptical gear wheels $m$, $m'$ which are so disposed, that at the beginning of the receding movement of the retarding lever $g$ and at the beginning of the movement of the slide $k$ in the direction of the arrow shown in Fig. 1 the velocity is reduced by the elliptical gear wheels, and that the ratio of transmission is gradually changed, so that the velocity is finally increased by the gear wheels. Therefore at the beginning of the movement the starting of the gear wheels $l$ and $m$ requires less power than near the end of the movement.

The initial position of the slide bar $k$ must be the same for all the different exposures. Therefore in my improved mechanism means are provided whereby the slide $k$ is prevented from taking part in the setting operation of the arresting member. As will be understood, this operation determines the time of the exposure which depends on the position of the retarding lever relatively to the shoulder $e$. Therefore in case of a shorter or longer exposure the resistance of the retarding lever $g$ has always at the beginning of its movement the smallest value, whereupon it is gradually increased. In case of a very short exposure the said resistance is but slightly increased as compared to its smallest value.

In the example shown in the drawing Fig. 2 the slide bar $k$ is made independent of the retarding lever $g$ by connecting the retarding lever $g$ and the slide bar $k$ by means of a toggle joint, which consists of a link $n$ jointed with its end $q$ to the slide bar $k$, and a link $p$ the pivot $o$ of which can be set by any known or preferred means, as has been indicated in Fig. 2 by the arrows pointing in opposite directions from the pivot $o$. The rocking lever $g$ engages in a longitudinal slot made in the link $p$. In Fig. 1 this toggle joint has been omitted, in order that the figure be as simple as possible. The retarding lever $g$ is set by shifting the pivot $o$ in the direction of the arrows shown in Fig. 2, and if this is done, the link $n$ rocks about its pivot $q$, while the slide bar $k$ remains at rest. If however the pivot $o$ is held in fixed position, and the arresting member $g$ is operated by the shoulder $e$, the slide bar $k$ is shifted.

It may be added, that the slide bar $k$ which during the exposure is shifted to the left must be returned into initial position, before the shutter is again opened. To show what may be done, a bell crank lever $r$ is provided which with one end is in position for shifting the slide bar $k$ to the right and into initial position and with its other arm in the path of the pin $a$. When the disk $c$ is turned in the direction of the arrow shown in Fig. 3 and its spring is put under tension, the bell crank lever $r$ is rocked so as to shift the slide bar $k$ into initial position. By the same operation the rocking lever $g$ is shifted into its position in which it is ready to retard the disk $c$.

I claim herein as my invention:

1. In a shutter mechanism for photographic cameras, the combination with a device taking part in the opening and closing movements of the shutter, of a member adapted to be thrown into coöperation with said device, rotary braking means, and transmission gearing intermediate and operatively connecting said member and braking means, said transmission gearing having an increasing ratio of transmission.

2. In a shutter mechanism for photographic cameras, the combination with a device taking part in the opening and closing movements of the shutter, of a member adapted to be thrown into coöperation with said device, rotary braking means, and elliptical transmission gearing intermediate and operatively connecting said member and braking means, said transmission gearing having an increasing ratio of transmission.

3. In shutter mechanism for photographic cameras, the combination with a member operable during the closing movement of the shutter, of retarding mechanism comprising a brake, and means for transmitting movement from said member to said brake at an increasing ratio of transmission.

In testimony whereof I have hereunto set my hand in presence of two subscribing witnesses.

REINHOLD HEIDECKE.

Witnesses:
  WILHELM LEHRKE,
  KARL MUNDT.

---

Copies of this patent may be obtained for five cents each, by addressing the "Commissioner of Patents, Washington, D. C."